United States Patent
Beatham et al.

(10) Patent No.: US 11,041,423 B2
(45) Date of Patent: Jun. 22, 2021

(54) METHOD AND SYSTEM FOR LEAK DETECTION AT A PARTICULATE FILTER

(71) Applicant: Ford Global Technologies, LLC, Dearborn, MI (US)

(72) Inventors: Eric Beatham, Livonia, MI (US); Michiel J. Van Nieuwstadt, Ann Arbor, MI (US); Allen Lehmen, Howell, MI (US); Douglas Martin, Canton, MI (US); Raymond Henry Berger, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

(21) Appl. No.: 16/358,588

(22) Filed: Mar. 19, 2019

(65) Prior Publication Data
US 2020/0300148 A1    Sep. 24, 2020

(51) Int. Cl.
| F01N 11/00 | (2006.01) |
| F02D 41/24 | (2006.01) |
| B01D 37/04 | (2006.01) |
| F02D 41/02 | (2006.01) |
| F02D 41/00 | (2006.01) |

(52) U.S. Cl.
CPC ........ *F01N 11/002* (2013.01); *F02D 41/2403* (2013.01); *B01D 37/046* (2013.01); *B01D 2201/54* (2013.01); *F01N 2550/04* (2013.01); *F01N 2560/07* (2013.01); *F01N 2560/08* (2013.01); *F01N 2900/0412* (2013.01); *F01N 2900/0418* (2013.01); *F01N 2900/0421* (2013.01); *F02D 41/0002* (2013.01); *F02D 41/0235* (2013.01)

(58) Field of Classification Search
CPC ............... F01N 11/002; F01N 2560/07; F01N 2560/08; F01N 2900/0412; F01N 2900/0418; F01N 2900/0421; F02D 41/2403
See application file for complete search history.

(56) References Cited

U.S. PATENT DOCUMENTS

| 9,664,095 | B2 | 5/2017 | Van Nieuwstadt et al. |
| 2010/0018186 | A1* | 1/2010 | Shibata .................. F01N 9/007 60/277 |
| 2014/0366515 | A1* | 12/2014 | Kowalkowski ..... G01M 15/106 60/311 |
| 2016/0222898 | A1* | 8/2016 | Ulrey ...................... F01N 9/002 |
| 2016/0356673 | A1 | 12/2016 | Taibi et al. |
| 2016/0369673 | A1* | 12/2016 | Hopka ................ F02D 41/1466 |

FOREIGN PATENT DOCUMENTS

JP    2015214895 A   * 12/2015   ........... F01N 3/0253

OTHER PUBLICATIONS

Machine translation of JP-2015214895-A, accessed Nov. 7, 2020. (Year: 2020).*

* cited by examiner

*Primary Examiner* — Jonathan R Matthias
(74) *Attorney, Agent, or Firm* — Geoffrey Brumbaugh; McCoy Russell LLP (57) ABSTRACT

Methods and systems are provided for diagnosing a gasoline particulate filter in an engine exhaust passage. A pressure-flow relationship of the filter is learned in a low engine speed and high engine speed range. Degradation of the filter is identified based on a substantial separation between the curve fits at the high and low speed range.

9 Claims, 7 Drawing Sheets

METHOD AND SYSTEM FOR LEAK DETECTION AT A PARTICULATE FILTER

FIELD

The present disclosure relates to systems and methods for leak detection at a particulate filter coupled in an internal combustion engine, such as a gasoline-fueled engine.

BACKGROUND/SUMMARY

Particulates (e.g., soot) may form in internal combustion engines as a byproduct of some combustion processes. For example, particulates may form in the exhaust gas at high engine speeds or high engine loads. The formation of particulates may also be related to the direct injection of fuel into engine cylinders. Particulate filters in the exhaust line may be used in order to retain the particulates and reduce soot emissions. Over time, the particulates accumulate within the filter, reducing the exhaust flow rate through the exhaust system and creating an engine back pressure which may reduce engine efficiency and fuel economy. To reduce the backpressure, the filter may be intermittently regenerated to burn off accumulated soot. However, even with intermittent regeneration, particulate filters may degrade and leak particulates to the atmosphere through the tailpipe.

One way to determine whether a particulate filter is leaking is through the use of pressure sensors, as shown by Nieuwstadt et al. in U.S. Pat. No. 9,664,095. Therein, a pressure drop is measured across an exhaust particulate filter via an upstream and a downstream exhaust oxygen sensor. The pressure drop is then used to infer leakage of the filter during conditions when an exhaust oxygen concentration across the filter is substantially constant.

However, the inventors herein have identified potential issues with such an approach. As one example, while there is substantial variation in the pressure-flow relationship for a functional GPF versus a leaking (or missing) GPF at high exhaust flow rates, there may be significant overlap between the pressure-flow relationship of the functional and faulted case at low exhaust flow rates (such as below 300 m³/h). In particular, the lower nominal pressure drop confounding effects of ash loading may result in lower separation in a GPF diagnostic as compared to a DPF diagnostic. As a result, it may be difficult to accurately and reliably diagnose GPK leakage. Further, due to the pressure generated by sharp exhaust pipe bends after the GPF and resonances in cavities, in some cases it may even be difficult to detect a completely missing GPF.

The inventors herein have recognized that the pressure-flow relationship across a GPF may vary with engine speed. In particular, at low engine speeds, resonances may be set up in the exhaust pipe if there is a missing or leaking GPF, which can result in a higher pressure drop. At higher speeds, the frequency may be too high to set up a standing wave, and the pressure drop may be lower. Thus in one example, the above mentioned issues may be addressed by a method for determining gasoline particulate filter (GPF) leakage, or degradation, in an engine exhaust comprising: comparing a first relationship between exhaust flow rate and differential pressure across an exhaust particulate filter in a first engine speed range, to a second relationship between exhaust flow rate and differential pressure across the particulate filter in a second engine speed range; and indicating particulate filter degradation based on the comparing. In this way, the detectability of leaking or missing GPFs is improved.

As an example, an exhaust system may include a first exhaust gas sensor (e.g., first oxygen sensor) located upstream of an exhaust gasoline particulate filter (GPF) and a second exhaust gas sensor (e.g., second oxygen sensor) located downstream of the GPF. A controller may generate a first plot mapping a relationship between pressure drop across the filter to exhaust flow rate in a first engine speed range, such as when engine speed is higher than a threshold speed. The controller may also generate a second plot mapping the relationship between pressure drop across the filter to exhaust flow rate in a second engine speed range, such as when engine speed is lower than the threshold speed. If the separation between a curve fit of the first plot relative to the curve fit of the second plot is higher than a threshold difference, GPF degradation is indicated. For example, a diagnostic code may be set.

In this way, existing exhaust gas sensors and pressure based GPF monitors may be advantageously used to infer particulate filter leakage without the need for other dedicated sensors. By monitoring the output of exhaust gas oxygen sensors coupled across a GPF at different engine speeds, a relationship between pressure drop across the GPF and exhaust flow across the GPF at high and low engine speeds can be correlated with filter health. The technical effect of correlating an exhaust pressure to flow relationship across a GPF captured at higher engine speeds to the same captured at lower engine speeds, a higher separation of curve fits can be achieved, even at lower flow rates. By improving the separation, the confounding effects of ash loading on a GPF diagnostic is reduced, increasing the reliability of the results of a GPF monitor. By improving the monitoring of particulate filter health, vehicle emissions may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
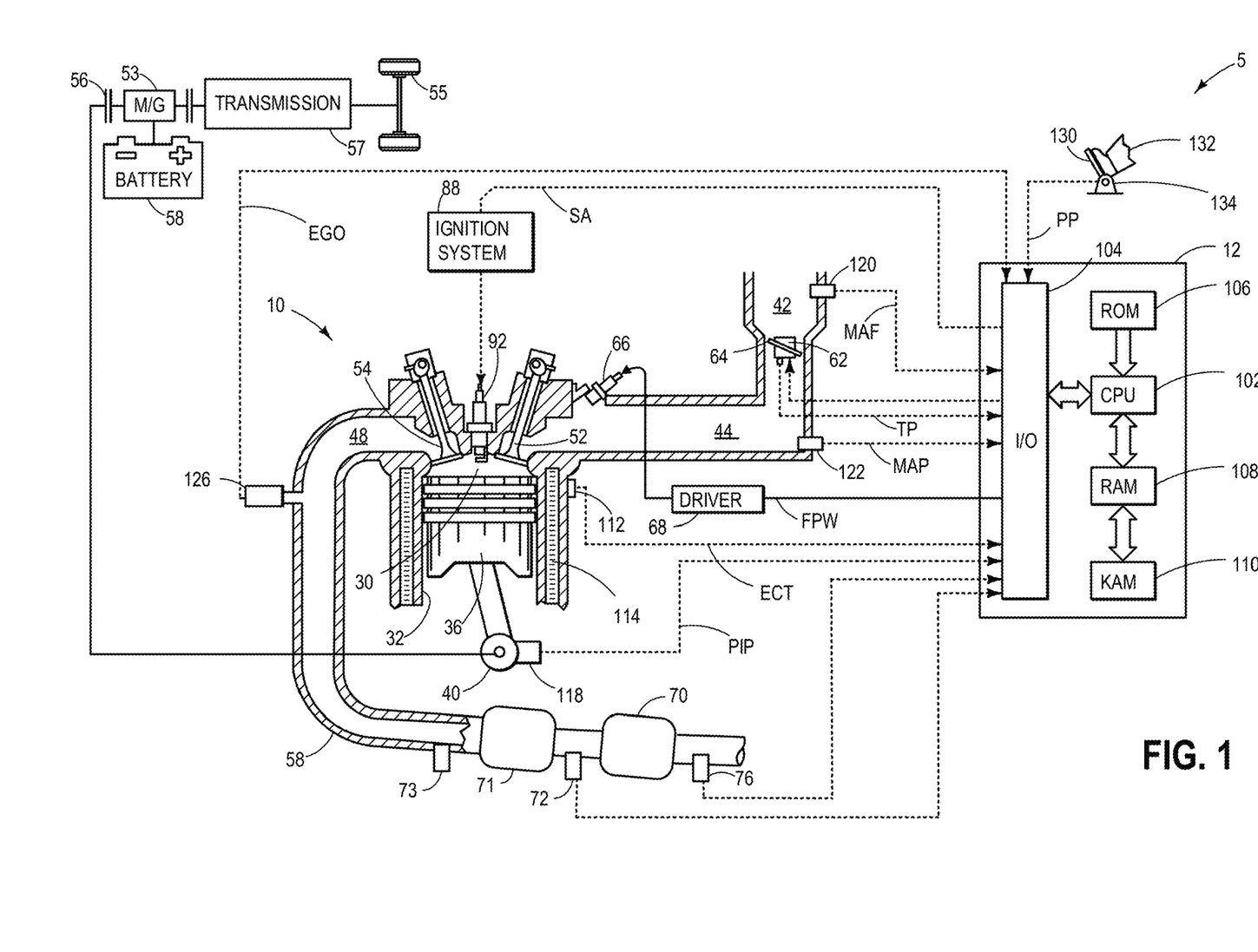
FIG. 1 schematically shows an engine with an exhaust system.
Figure 2A:
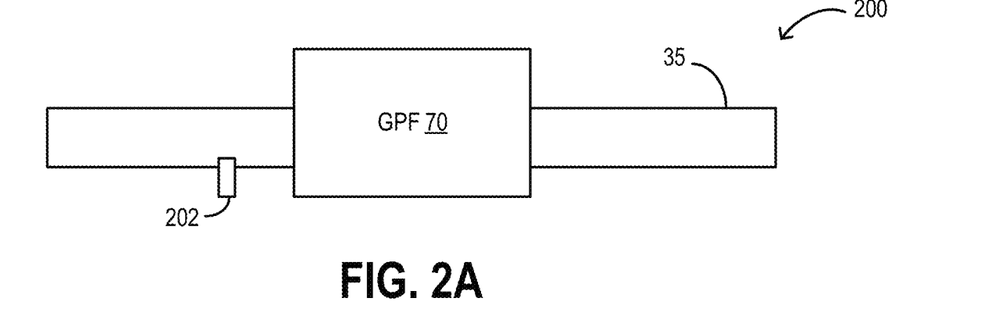
FIGS. 2A-2C schematically show example embodiments of pressure sensor arrangements coupled to an exhaust particulate filter.
Figure 2B:
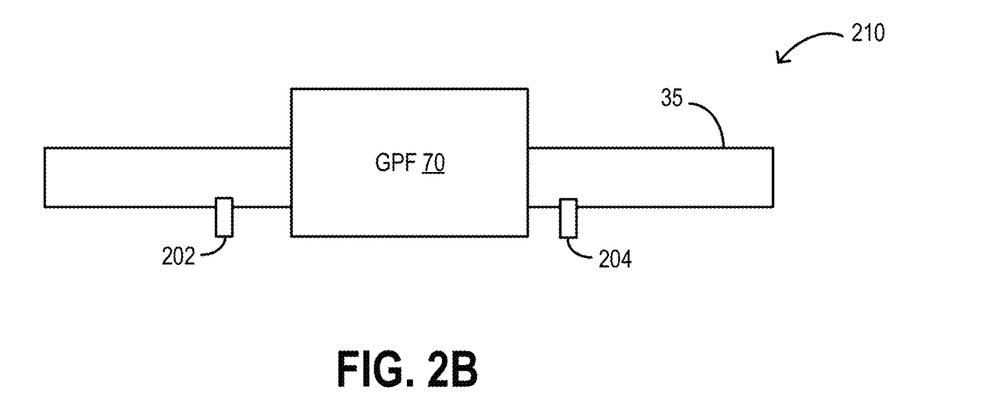
Figure 2C:
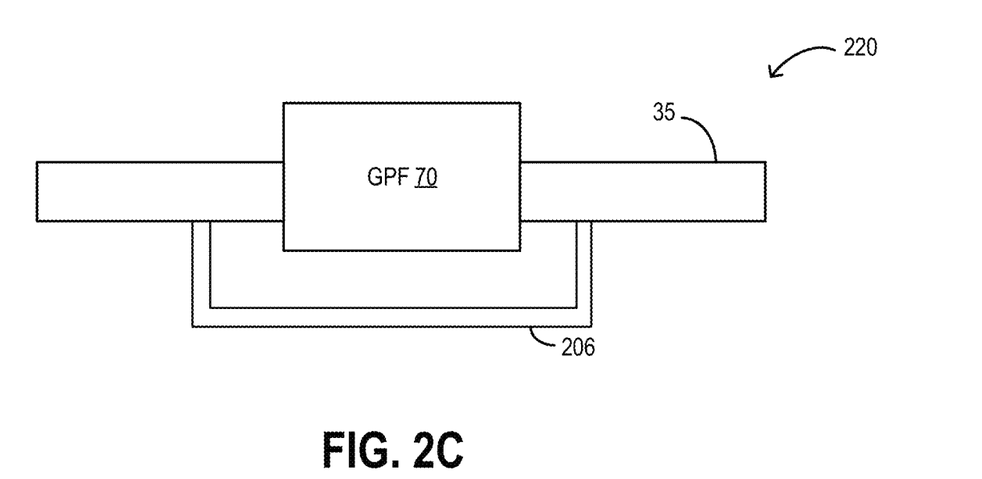

The present description relates to methods and systems for diagnosing degradation of particulate matter from a gasoline particulate filter (GPF) coupled to an engine exhaust system, such as the exhaust system of FIGS. 1-2. An engine controller may be configured to perform diagnostic routines, such as those depicted in FIGS. 3-5, to correlate a pressure drop across the particulate filter with exhaust flow through the filter in different engine speed ranges. The controller may compare a curve fit of the pressure-flow data captured during high engine speed conditions to another curve fit of the pressure-flow data captured during low engine speed conditions, such as the curve fits of FIG. 7. The controller may then correlate a change in the curve fit with changing engine speed with GPF health, allowing for improved GPF diagnostics, even at low flow rates, over methods that do not account for engine speed (such as the approach used in FIG. 6). In this way, filter diagnostics may be improved, thereby improving emissions compliance.

Turning to FIG. 1, a schematic diagram of one cylinder of multi-cylinder engine 10, which may be included in a propulsion system of a vehicle 5, is shown. Vehicle 5 may be configured for on-road propulsion. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber 30 (also termed, cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown arranged in intake manifold 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 coupled upstream of throttle 62 for measuring the flow rate of aircharge entering into the cylinder through throttle 62. Intake passage 42 may also include a manifold air pressure sensor 122 coupled downstream of throttle 62 for measuring manifold air pressure MAP.

In some embodiments, a compression device, such as a turbocharger or supercharger, including at least a compressor (not shown), may be arranged along intake manifold 44. For a turbocharger, the compressor may be at least partially driven by a turbine (not shown), for example via a shaft, the turbine arranged along exhaust manifold 48. For a supercharger, the compressor may be at least partially driven by the engine and/or an electric machine, and may not include a turbine.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 58 upstream of emission control device 70. Sensor 126 may be any suitable sensor for providing an indication of exhaust gas air-fuel ratio such as a linear oxygen sensor or UEGO (universal or wide-range exhaust gas oxygen), a narrow band (older systems treat as a two-state device) oxygen sensor or EGO, a HEGO (heated EGO), a NOx, HC, or CO sensor. Emission control devices 71 and 70 are shown arranged along exhaust passage 58 downstream of exhaust gas sensor 126. The first emission control device 71 is upstream of the second emission control device 70. First emission control device 71 may be a three way catalyst (TWC), SCR catalyst, NOx trap, or one of various other emission control devices. In the depicted example, the second emission control device 70 is a gasoline particulate filter (GPF). In other embodiments, emission control device 71 and 70 may be combined into one single device with two separate volumes, and a mid-bed sensor may be positioned between the two volumes within the emission control device to detect air-fuel ratio in the middle of the catalyst.

Further, engine 10 may include an exhaust gas recirculation (EGR) system (not shown) to help lower NOx and other emissions. The EGR system may be configured to recirculate a portion of exhaust gas from the engine exhaust to the engine intake. In one example, the EGR system may be a low pressure EGR system wherein exhaust gas is recirculated from downstream of gasoline particulate filter 70 to the engine intake.

First emission control device 71 may process engine exhaust gases to oxidize exhaust gas constituents, for example. For example, emission control device 71 may be placed in the exhaust passage 58 in a close coupled position. The gasoline particulate filter (GPF) 70, herein also referred to as particulate filter or filter 70, positioned in an engine exhaust passage 58, downstream of first emission control device 71, is configured to retain residual soot and other hydrocarbons exhausted from engine 10 in order to lower particulate emissions. The retained particulates may be oxidized to produce carbon dioxide in a regeneration process that is performed during engine operation, thereby reducing the soot load of the GPF. During regeneration, a temperature of the GPF, and the exhaust entering the GPF, may be raised to burn off the stored soot. As such, GPF regeneration may be performed at high exhaust temperatures (e.g., 600° C. and above) so that the retained particulates are combusted in a quick manner and are not released to the atmosphere. To speed up the regeneration process and oxidize the soot in an efficient manner, exhaust gas entering the particulate filter may be temporarily enleaned. In some embodiments, GPF 70 may include a washcoat to lower emissions further. For example, the washcoat may comprise one or more of a lean NOx trap (LNT), a selective catalytic reducer (SCR) or a catalytic oxidizer (CO). Further, the washcoat loading may be varied when applied to the filter.

The exhaust passage 58 may include at least two exhaust gas sensors. In the depicted embodiment, three exhaust gas sensors 126, 72, and 76 are shown coupled in the exhaust. Exhaust sensor 72 may be positioned upstream of GPF 70 while exhaust sensor 76 is positioned downstream of GPF 70. In one example, at least one or more of the exhaust gas sensors 126, 72, and 71 may be oxygen sensors which may be selected from among various suitable sensors for providing an indication of exhaust gas air/fuel ratio. In another example, at least sensors 72, 71 may be pressure sensors for measuring a pressure drop across the filter. The pressure sensors may be gage pressure sensors, or differential pressure sensors. Example pressure sensor configurations that may be used for measuring a pressure drop across the GPF are shown with reference to FIGS. 2A-2C.

The oxygen sensors may be linear oxygen sensors or switching oxygen sensors. As an example, the oxygen sensors may be one of a UEGO sensor (universal or wide-range exhaust gas oxygen), a two-state oxygen sensor or EGO sensor, or a HEGO (heated EGO) sensor. Exhaust gas oxygen sensors 126 (and if so configured, sensors 76, 72) may assess a concentration of oxygen present in the exhaust gas and sense tailpipe exhaust oxygen concentrations about the GPF 70. Exhaust gas sensor 126 may be a feed-gas oxygen sensor positioned upstream of emissions control device 71 configured to sense feed-gas exhaust oxygen concentrations. Pressure sensors 76, 72, when so configured, may be used to estimate a pressure drop across the GPF 70.

Other sensors, such as an air mass flow (AM) sensor 73, and/or a temperature sensor may be disposed upstream of the first emission control device 71 to monitor the mass flow and temperature of the exhaust gas entering the emission control devices. The sensor locations shown in FIG. 1 are just one example of various possible configurations. For example, the emission control system may include one emission control device with a partial volume set-up with close coupled catalysts.

The air-fuel ratio of exhaust released from cylinders 30 may be determined by one or more of the oxygen sensors located in the exhaust stream of the engine. Based on the estimated exhaust air-fuel ratio, fuel injection to engine cylinders may be adjusted so as to control the air-fuel ratio of cylinder combustion. For example, fuel injection amounts to the cylinders may be adjusted based on a deviation of the exhaust air-fuel ratio, estimated based on the output of one or more of the exhaust gas sensors 126, 72, and 76, and a desired air-fuel ratio (such as a deviation from stoichiometry).

To enable emissions compliance, the GPF may be intermittently diagnosed, such as for leakage or for removal. As elaborated at FIGS. 3-5, the controller may measure a pressure change across the GPF at different exhaust flow levels to generate a pressure-flow curve. The inventors herein have recognized that while there is substantial variation in the pressure-flow relationship for a functional GPF versus a leaking (or missing) GPF at high exhaust flow rates, there is a significant overlap between the pressure-flow relationship of the functional and faulted case at low exhaust flow rates (such as below 300 m$^3$/h). This is shown at FIG. 6. Map 600 shows pressure-flow data collected for a functional GPF (black dots creating curve fit 602) and compares it to the data collected for a leaking or missing GPF (grey dots creating curve fit 604). The map depicts exhaust flow through a GPF (in m$^3$/h) along the x-axis and a pressure drop across the GPF (in hPa) along the y-axis. As can be seen by comparing the curve fits, there is lower separation between the curve fits at lower flow rates. This may be due to a lower nominal pressure drop due to the confounding effects of ash loading in the GPF. Specifically, ash loading has the effect of moving the curve for the degraded GPF (see curve fit 604 of FIG. 6) in the upward direction, thus decreasing separation, even when a leak is present. As a result, at low flow rates, it may be difficult to accurately and reliably distinguish a functional GPF from a leaking GPF. If the GPF is incorrectly diagnosed as being functional when it is leaking, emissions are degraded. If the GPF is incorrectly diagnosed as degraded when it is functional, it can result in warranty issues. Further, due to the pressure generated by sharp exhaust pipe bends after the GPF and resonances in cavities, in some cases it may even be difficult to detect a completely missing GPF. By generating pressure-flow curves at two different engine speed ranges, as elaborated at FIG. 3, such as a higher than threshold speed range and a lower than threshold speed range, and comparing the curve fits at the two conditions, the variation between the curve fits is increased, improving the reliability of the diagnostic results.

Returning to FIG. 1, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 53. Electric machine 53 may be a motor or a motor/generator. Crankshaft 140 of engine 10 and electric machine 53 are connected via a transmission 57 to vehicle wheels 55 when one or more clutches 56 are engaged. In the depicted example, a first clutch 56 is provided between crankshaft 140 and electric machine 53, and a second clutch 56 is provided between electric machine 53 and transmission 57. Controller 12 may send a signal to an actuator of each clutch 56 to engage or disengage the clutch, so as to connect or disconnect crankshaft 140 from electric machine 53 and the components connected thereto, and/or connect or disconnect electric machine 53 from transmission 57 and the components connected thereto. Transmission 57 may be a gearbox, a planetary gear system, or another type of transmission. The powertrain may be configured in various manners including as a parallel, a series, or a series-parallel hybrid vehicle.

Electric machine 53 receives electrical power from a traction battery 58 to provide torque to vehicle wheels 55. Electric machine 53 may also be operated as a generator to provide electrical power to charge battery 58, for example during a braking operation.

Controller 12 is shown in FIG. 1 as a microcomputer, including microprocessor unit 102, input/output ports 104, an electronic storage medium for executable programs and calibration values shown as read only memory 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; air mass and/or temperature of the exhaust gas entering the catalyst from sensor 73; post-GPF exhaust pressure from sensor 76; pre-GPF exhaust pressure from sensor 72, and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses for each revolution of the crankshaft. Additionally, controller 12 may communicate with a cluster display device, for example to alert the driver of faults in the engine or exhaust after-treatment system.

Storage medium read-only memory 106 can be programmed with computer readable data representing instructions executable by processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. For example, adjusting fuel injection may include adjusting pulse width signal FPW to electronic driver 68 to adjust the amount of fuel injected to the cylinder via fuel injector 66.

Turning now to FIGS. 2A-2C, example configurations and architectures of pressure sensors coupled to an exhaust GPF are shown. The configurations enable a pressure drop across the GPF to be measured at different rates of exhaust flow across the GPF. In each of FIGS. 2A-2C, the GPF is GPF 70, which may be the same as GPF 70 of FIG. 1.

FIG. 2A shows a first embodiment 200 wherein a single pressure sensor 202 is coupled upstream of the GPF 70. Herein the pressure sensor 202 is a gage pressure sensor. For example, the single pressure sensor 202 may be coupled upstream of GPF 70 and downstream of an exhaust catalyst. Since this configuration only uses one pressure sensor with a single hose, it has the advantage of being cost effective.

FIG. 2B shows a second embodiment 210 wherein a pair of pressure sensors 202, 204 are coupled across the GPF 70. In particular, sensor 202 is coupled upstream of the GPF 70 (as in the configuration of FIG. 2A) while sensor 204 is coupled downstream of the GPF 70. Herein the pressure sensors 202, 204 are gage pressure sensors. By comparing the output of the pressure sensors, a pressure drop across the GPF 70 can be estimated. The two sensor configuration has the advantage of being more accurate since it explicitly compensates for drift in pressure drop over the cold end.

FIG. 2C shows a third embodiment 220 wherein a single sensor 206 is coupled across the GPF 70. Herein, sensor 206 is a differential pressure sensor configured to estimate a pressure difference across the GPF 70, instead of an absolute pressure measurement. The delta pressure sensor configuration has the advantage of being between the single and 2 gage sensor solutions both in cost and capability.

Figure 3:
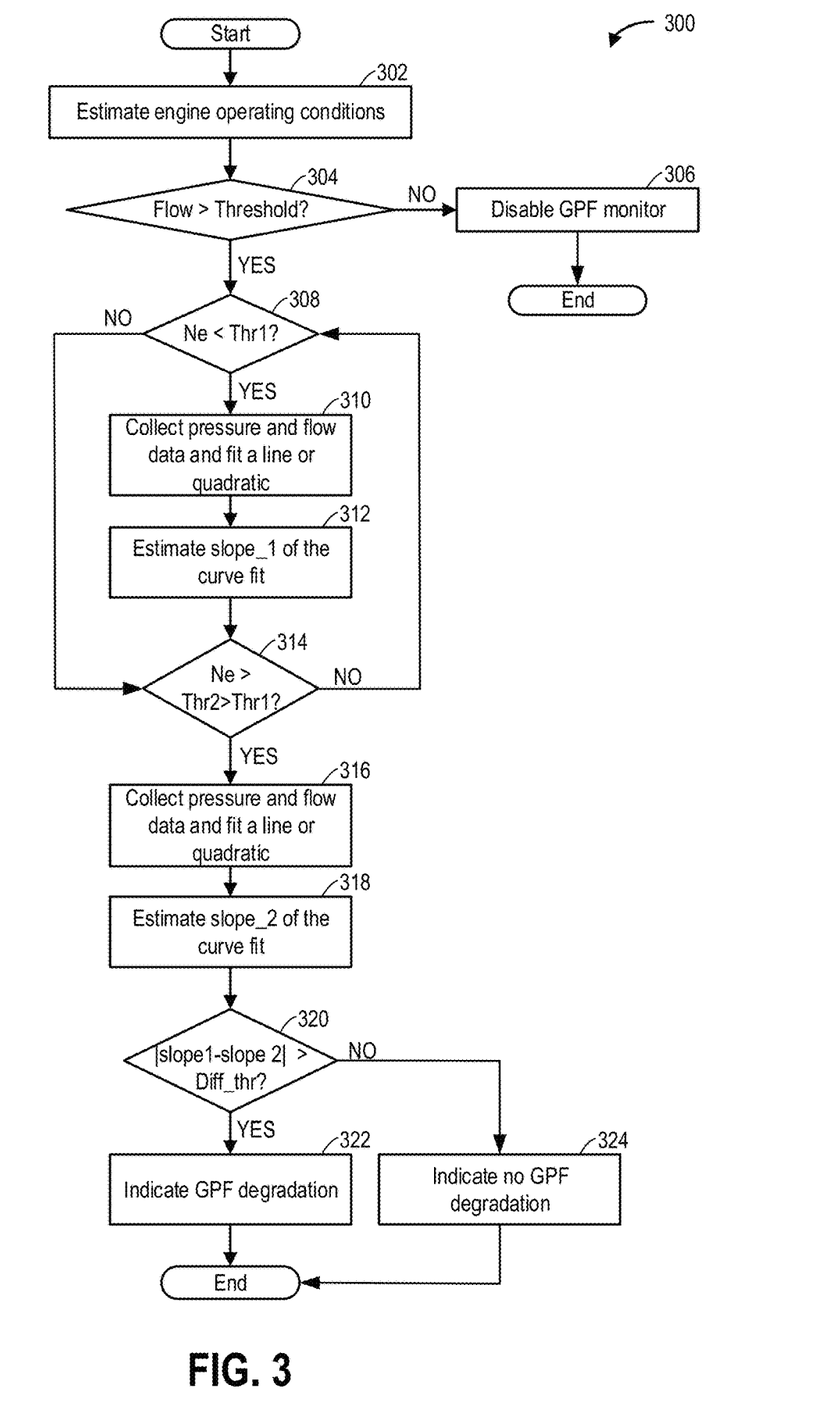
FIG. 3 shows an example embodiment of a GPF diagnostic routine based on pressure/flow data and engine speed.
Figure 4:
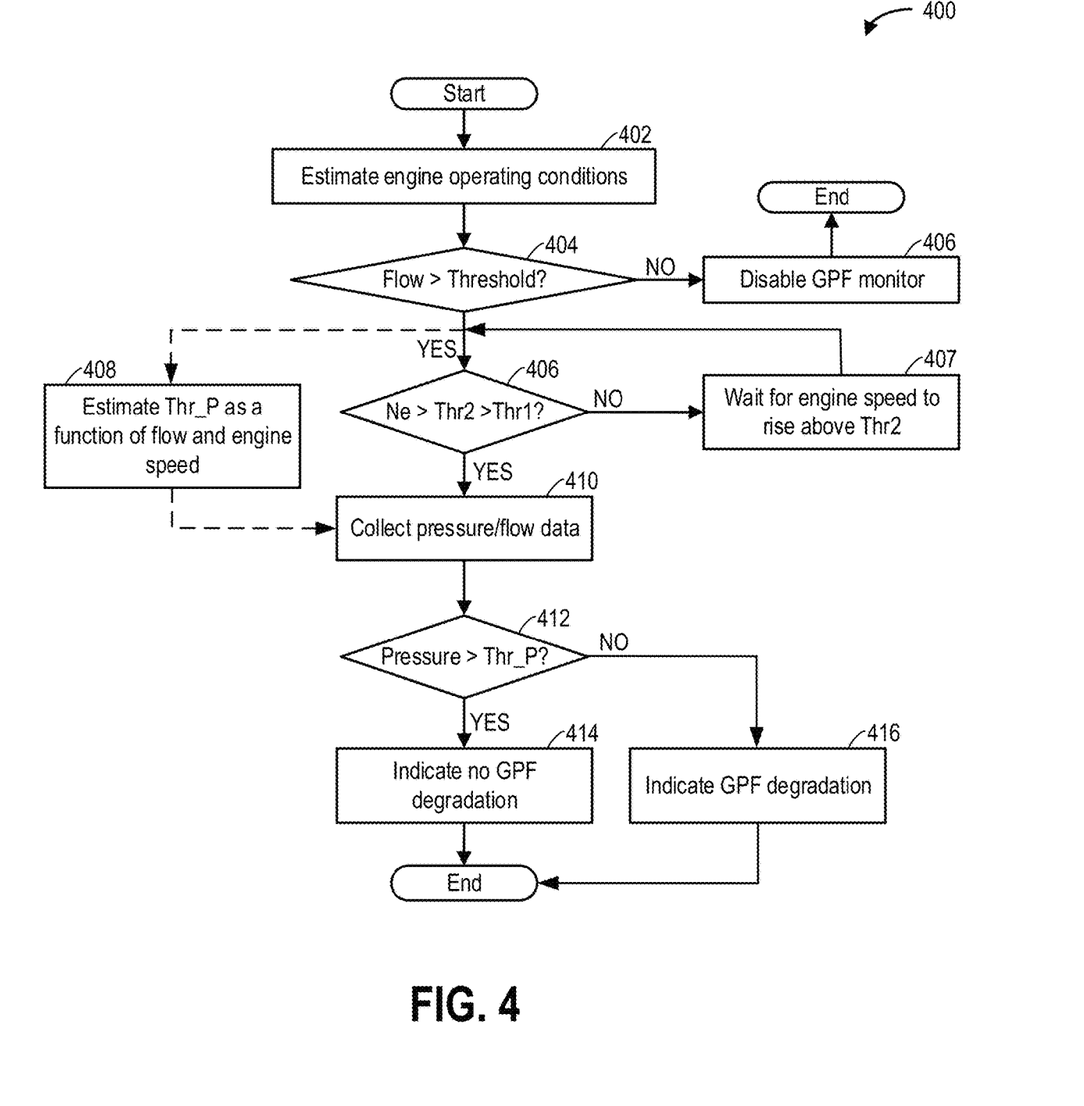
FIG. 4 shows another example embodiment of a GPF diagnostic routine.

Turning now to FIG. 3, an example method 300 is shown for diagnosing an exhaust GPF by correlating a pressure-flow relationship of the GPF, as measured in a high and a low engine speed range. The method improves separation of curve fits, even at lower flow rates. Additional embodiments of the method of FIG. 3 are shown at FIG. 4. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2A-2C. The controller may employ engine actuators of the engine system to adjust engine operation, according to the methods described below.

At 302, the method may determine engine operating parameters. For example, the method may determine operator torque demand, engine speed-load conditions, engine temperature, exhaust temperature, exhaust flow rate, boost level, etc.

At 304, it may be confirmed that the exhaust flow rate is higher than a threshold. For example, it may be confirmed that the exhaust flow rate is higher than 200 m$^3$/hr. Since the separation between curve fits for a degraded GPF and a functional GPF is improved at higher exhaust flow rates, the GPF monitor is executed selectively when exhaust flow is higher than the threshold. If the exhaust flow rate is not higher than the threshold, then at 306, the method includes disabling the GPF monitor and not collecting any GPF related data.

Upon confirming that the higher than threshold exhaust flow rate, at 308, the method includes confirming that the engine speed (Ne) is lower than a first threshold (Thr1), such as below 2000 rpm. Herein, the lower than threshold engine speed range may be a first engine speed range in which pressure and flow data for the GPF are collected. If the engine speed is not lower than the first threshold, the method moves to 314 to determine if the engine speed is in a second engine range.

Upon confirming that the engine is operating in the first speed range, at 310, the method includes collecting pressure and flow data for the GPF while the engine operates in the first speed range. As an example, the exhaust flow rate may be estimated based on engine operating conditions or based on the output of an intake or exhaust flow sensor (such as MAF sensor 120 or AM sensor 73 of FIG. 1). As another example, the pressure data may be collected by a pressure sensor, such as sensors 72 and/or 76 of FIG. 1, or any of the pressure sensor configurations of FIGS. 2A-2C. The pressure data may include a sensed change or drop in pressure across the GPF. The pressure data may be sensed by a gage pressure sensor, or a differential pressure sensor. After collecting the pressure and flow data, the controller may fit a line or quadratic curve to the collected data. An example of pressure and flow data collected in a lower engine speed range is shown by grey data dots and a corresponding in map 600 of FIG. 6.

At 312, the method includes estimating a first slope (slope_1) of the curve fit of the pressure-flow data collected for the GPF in the lower engine speed range.

At 314, it may be confirmed that the engine speed (Ne) is higher than a second threshold (Thr2), which is higher than the first threshold (Thr1). For example, it may be confirmed that the engine speed is above 3000 rpm. Herein, the higher than threshold engine speed range may be a second engine speed range in which pressure and flow data for the GPF are collected. If the higher than second threshold engine speed range is not confirmed, the method returns to 308 to continue collecting data in the first engine speed range. Further, in between the first and second threshold speed, such as between 2000 and 3000 rpm, the controller may wait for the engine speed to rise before starting to collect data at the higher than second threshold speed.

Upon confirming that the engine is operating in the second speed range, at 316, the method includes collecting pressure and flow data for the GPF while the engine operates in the second speed range. As an example, the exhaust flow rate may be estimated based on engine operating conditions or based on the output of an intake or exhaust flow sensor (such as MAF sensor 120 or AM sensor 73 of FIG. 1). As another example, the pressure data may be collected by a pressure sensor, such as sensors 72 and/or 76 of FIG. 1, or any of the pressure sensor configurations of FIGS. 2A-2C. The pressure data may include a sensed change or drop in pressure across the GPF. The pressure data may be sensed by a gage pressure sensor, or a differential pressure sensor. After collecting the pressure and flow data, the controller may fit a line or quadratic curve to the collected data. At 318, the method includes estimating a second slope (slope_2) of the curve fit of the pressure-flow data collected for the GPF in the higher engine speed range.

At 320, it is determined if the slope of the curve fit of the pressure-flow data collected in the lower speed range is significantly different from the slope of the curve fit of the pressure-flow data collected in the higher speed range. For example, an absolute difference between slope_1 and slope_2 is calculated and compared to a non-zero threshold value (for example, a difference greater than 5 hPa(m3/h)). In some examples, the threshold may be further adjusted as a function of barometric pressure or altitude.

If the curve fit slopes are determined to be different by more than the threshold value, then at 322, it may be indicated that the GPF is degraded. For example, it may be indicated that the GPF is leaking, or that the GPF is missing. For example, the controller may be able to distinguish certain intermediate leak sizes from a missing GPF. Degradation may be indicated by setting a diagnostic code or flag, and/or illuminating a malfunction indicator light. If the curve fit slopes are determined to be different by less than the threshold value, such as when the curve fit slopes are essentially the same, then at 324, it may be indicated that the GPF is not degraded.

Figure 5:
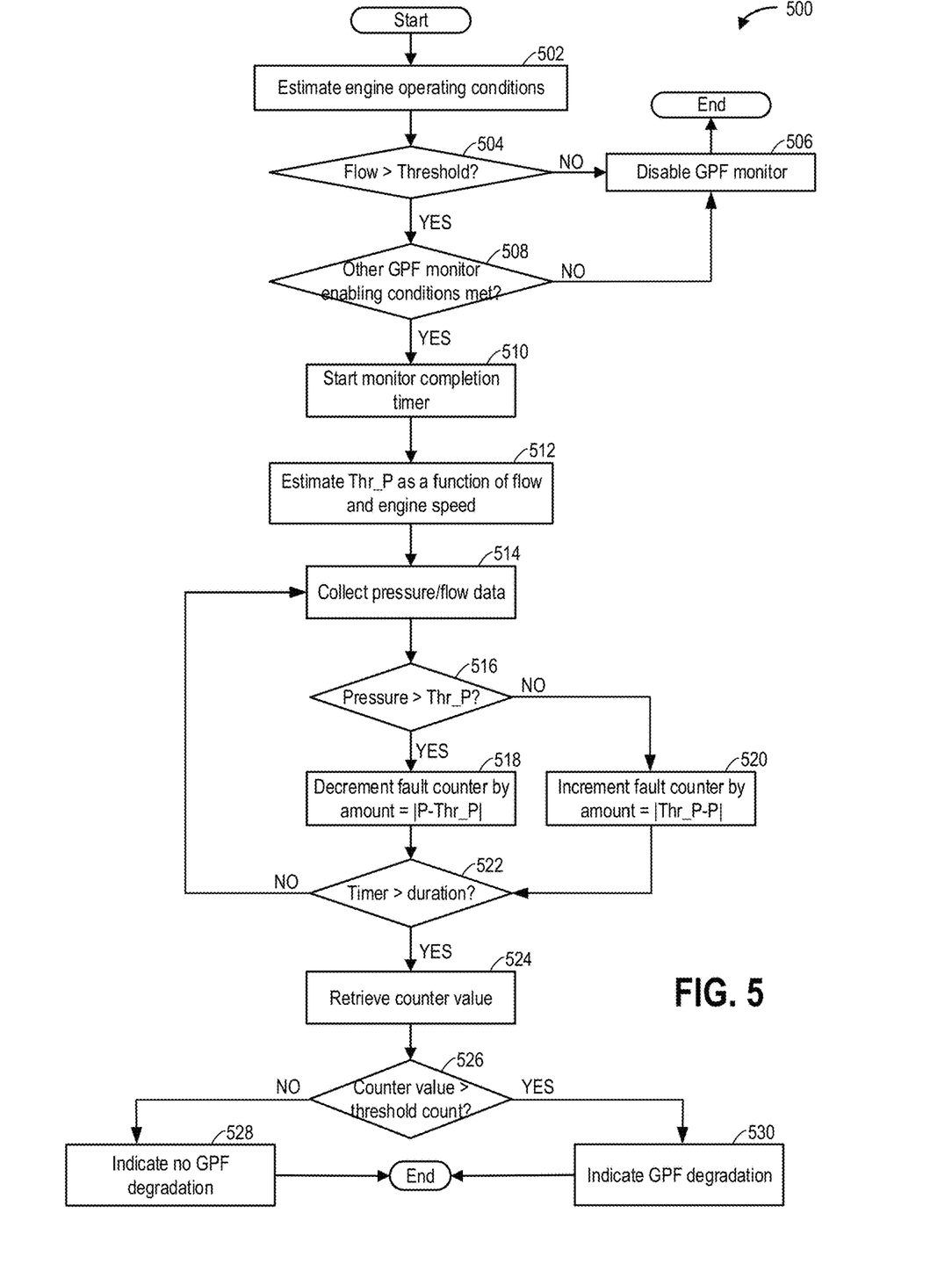
FIG. 5 shows yet another example embodiment of a GPF diagnostic routine.
Figure 6:
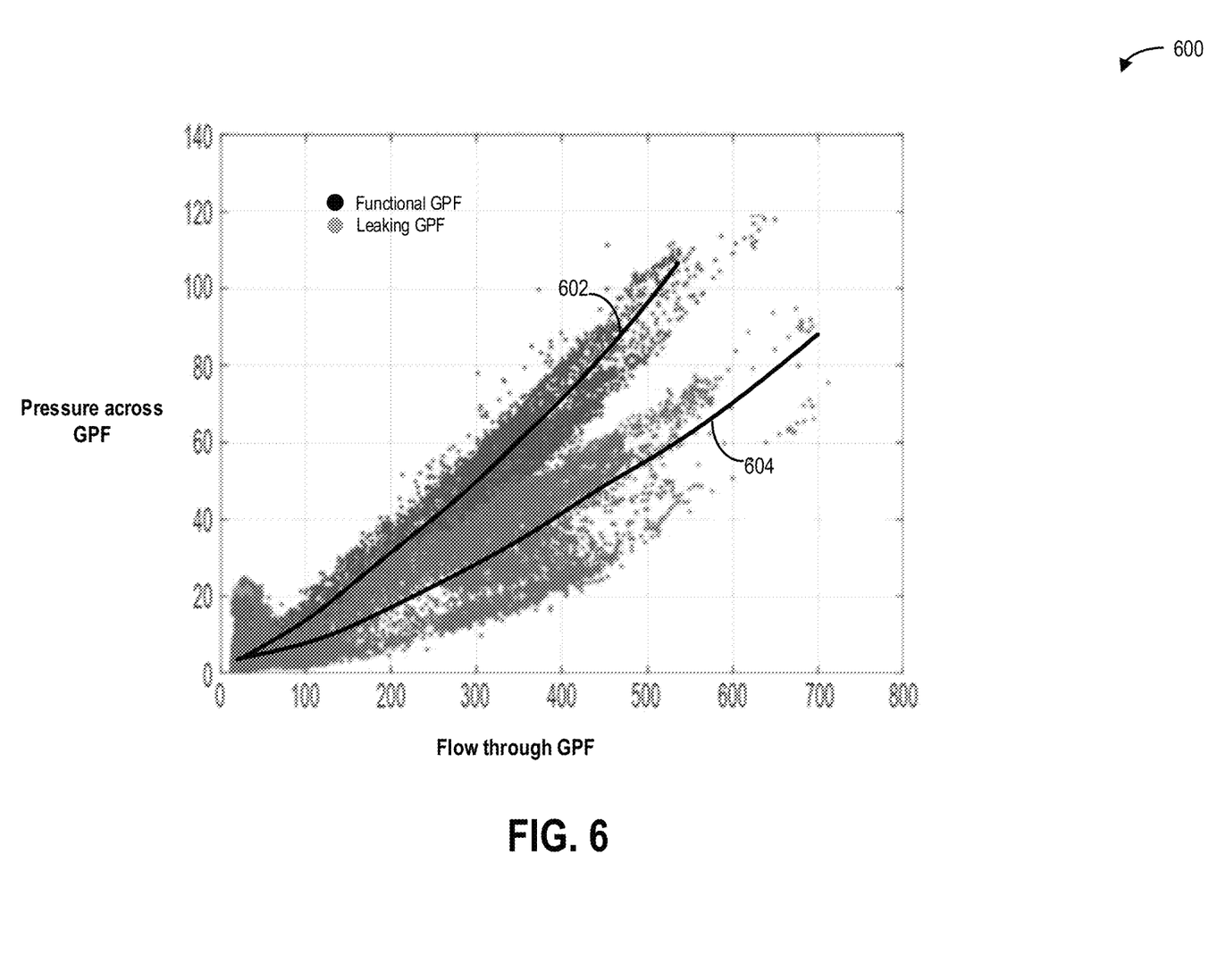
FIG. 6 shows example pressure-flow curves for a GPF diagnostic routine as known in the prior art.

Alternate embodiments of the method of FIG. 3 are depicted at FIGS. 4 and 5. Turning first to FIG. 4, method 400 starts at 402 by estimating and/or measuring engine operating conditions, as at 302. At 404, it may be confirmed that the exhaust flow rate is higher than a threshold. For example, it may be confirmed that the exhaust flow rate is higher than 200 m³/hr. By confirming that the exhaust flow is higher than the threshold, separation of curve fits is improved, increasing the reliability of the monitor. If the exhaust flow rate is not higher than the threshold, then at 406, the method includes disabling the GPF monitor and not collecting any GPF related data.

Upon confirming the higher than threshold exhaust flow rate, at 408, the method includes confirming that the engine speed (Ne) is higher than a second threshold, such as the second threshold applied in the diagnostic of FIG. 3. The second threshold is higher than a first threshold, and may include engine speeds above 3000 rpm, such as the higher engine speed range of the method of FIG. 3. If the engine speed is not higher than the second threshold, the method moves to 407 where the controller waits for the engine speed to rise to or above the second threshold speed.

Upon confirming that the engine speed is in the higher speed range, the method moves to 410 to collect pressure and flow data for the GPF. As an example, the exhaust flow rate may be estimated based on engine operating conditions or based on the output of an intake or exhaust flow sensor while the pressure data may be collected by a pressure sensor, such as in any of the pressure sensor configurations of FIGS. 2A-2C. The pressure data may include a sensed change or drop in pressure across the GPF. The pressure data may be sensed by a gage pressure sensor, or a differential pressure sensor.

At 412, the method includes comparing the pressure to a threshold pressure, such as a threshold pressure having a value in between a pressure value corresponding to an intact GPF and a pressure value corresponding to a degraded GPF (such as a pressure value between curve fits 602 and 604 in FIG. 6). If the pressure value is higher than the threshold pressure (Thr_P), then at 414, it may be indicated that the GPF is not degraded. Else, if the pressure value is lower than the threshold pressure, then at 416, it may be indicated that the GPF is degraded. For example, it may be indicated that the GPF has an intermediate sized leak, or that the GPF is missing based on the difference from the threshold pressure. Degradation may be indicated by setting a diagnostic code or flag, and/or illuminating a malfunction indicator light.

In a further variation of the method of FIG. 4, after confirming the higher than threshold exhaust flow at 404, the method may move to 408 to estimate the threshold pressure used for the diagnostic (Thr_P) as a function of exhaust flow rate and engine speed. For example, as the exhaust flow rate exceeds the threshold flow rate, the threshold pressure is increased. As another example, as the current engine speed increases, the threshold pressure is decreased. In particular, at higher engine speeds (e.g., higher than a threshold speed), the threshold pressure is decreased and/or at lower engine speeds (e.g., lower than the threshold speed), the threshold pressure is increased. The method then returns to 410 to collect pressure and flow data and diagnose the GPF based on the pressure relative to the threshold pressure.

In yet another variation, the pressure threshold for the GPF leakage monitor is determined as a function of GPF flow, engine speed, and altitude to address all dependencies. For example, the threshold pressure may be determined according to equation (1) as:

$$\text{Gpf\_leak\_thr} = f1(\text{p\_baro}) * \text{g\_sealevel}(\text{RPM, GPF flow}) + (1 - f1(\text{p\_baro})) * \text{g\_high\_alt}(\text{RPM, GPF flow}) \quad (1)$$

wherein f1 is a function of barometric pressure, accounting for altitude, g_sealevel is the threshold at sea level, and g_high_alt is the threshold at 8000 feet altitude. The controller may set a fault if the GPF pressure is below this threshold, a fault may be healed (or removed) if the GPF pressure is above this threshold pressure.

Turning now to FIG. 5, method 500 starts at 502 by estimating and/or measuring engine operating conditions, as at 302 and 402. At 504, as at 404, it may be confirmed that the exhaust flow rate is higher than a threshold. For example, it may be confirmed that the exhaust flow rate is higher than 200 m³/hr. By confirming that the exhaust flow is higher than the threshold, separation efficiency between curves for degraded and non-degraded filters is improved. If the exhaust flow rate is not higher than the threshold, then at 506, the method includes disabling the GPF monitor and not collecting any GPF related data.

Upon confirming the higher than threshold exhaust flow rate, at 508, the method includes confirming that one or more other GPF monitor enabling conditions have been met. These include, for example, confirming that the ambient pressure and temperature are within a target range. Other enabling conditions may include engine coolant temperature, exhaust temperature, engine speed and load being within target ranges. These conditions may be calibrated to improve stability of the diagnostic. For example, exhaust temperatures between 300-700° C. may be indicative of stable engine operation such that temperature gradients are small and do not corrupt the flow measurement. If any of the other enabling conditions are not met, the method returns to 506 to disable the GPF monitor. Else, if the other enabling conditions are met, the monitor is initiated and at 510, a monitor completion timer is started.

Next, at 512, the method determines a threshold pressure to be used for the diagnostic (Thr_P). The threshold pressure may be determined as a function of exhaust flow rate and engine speed. The controller may refer a look-up table that is populated as a function engine speed and exhaust flow rate. As an example, as the exhaust flow rate exceeds a threshold flow rate, the threshold pressure in the look-up table is increased. As another example, as the current engine speed increases, the threshold pressure in the look-up table is increased. Further still, the threshold pressure may be determined via a model or an algorithm.

Next, at 514, the method includes collecting pressure and flow data for the GPF. As an example, the exhaust flow rate may be estimated based on engine operating conditions or based on the output of an intake or exhaust flow sensor while the pressure data may be collected by a pressure sensor, such as in any of the pressure sensor configurations of FIGS. 2A-2C. The pressure data may include a sensed change or drop in pressure across the GPF. The pressure data may be sensed by a gage pressure sensor, or a differential pressure sensor.

At 516, the method includes comparing the pressure to the earlier determined threshold pressure. Thereafter, a fault counter may be incremented or decremented by an amount that is a function of a difference between the observed pressure and the threshold pressure. The fault counter may be software or algorithm stored in the controller's memory and configured to increment or decrement a value when specific criteria are met. In particular, if the pressure value is higher than the threshold pressure (Thr_P), then in anticipation of no GPF degradation, a fault counter in the controller's memory may be decremented at 518. The fault counter may be decremented by an amount that is based on the difference between the threshold pressure and the observed pressure. Thus as the pressure difference increases, the fault counter is decremented by a larger amount, indicating a lower potential for GPF degradation.

Else, if the pressure value is lower than the threshold pressure (Thr_P), then in anticipation of GPF degradation, a fault counter in the controller's memory may be incremented at 520. The fault counter may be incremented by an amount that is based on the difference between the threshold pressure and the observed pressure. Thus as the pressure difference increases, the fault counter is incremented by a larger amount, indicating a higher potential for GPF degradation.

At 522, it may be determined if the time elapsed on the monitor completion timer has exceeded a threshold duration. For example, it may be determined if the timer value has exceeded a threshold duration which may be between 5 and 30 seconds. If not, then the method returns to 514 to continue collecting pressure and flow data at the GPF and incrementing or decrementing the fault counter as a function of the observed pressure relative to a threshold pressure. If the timer duration has elapsed, then at 524, the counter value is retrieved. For example, the current value on the fault counter is retrieved from the controller's memory. At 526, the retrieved counter value is compared to a non-zero threshold count. For example, the threshold count may be 10 counts, and may be indicative of a functional GPF. If the counter value exceeds the threshold count, then at 530, it may be indicated that the GPF is degraded. For example, it may be indicated that the GPF is leaking, or that the GPF is missing. Further, it may be possible to distinguish an intermediate sized leak from a missing GPF based on the counter value relative to the threshold count. Degradation may be indicated by setting a diagnostic code or flag, and/or illuminating a malfunction indicator light. If the counter value does not exceed the threshold count, then at 528, it may be indicated that the GPF is not degraded.

In another variation, the pressure threshold for the GPF leakage monitor is determined as a function of GPF flow, engine speed, and altitude to address all dependencies. For example, the threshold pressure may be determined according to equation (1) as:

$$\text{Gpf\_leak\_thr} = f1(p\_baro) * g\_sealevel(RPM, GPF\ flow) + (1 - f1(p\_baro)) * g\_high\_alt(RPM, GPF\ flow) \quad (1)$$

wherein f1 is a function of barometric pressure, accounting for altitude, g_sealevel is the threshold at sea level, and g_high_alt is the threshold at 8000 feet altitude. The controller may increment the fault counter if the GPF pressure is below this threshold, and decrement the fault counter if the GPF pressure is above this threshold pressure.

In one example, the method of FIG. 3 may be selected responsive to a first condition, the method of FIG. 4 may be selected responsive to a second condition, and the method of FIG. 5 may be selected responsive to a third condition, the first, second, and third condition differing from each other. Further, the different algorithms may be optimized for different exhaust configurations such as single or dual banked engines, different angles in pipe bends, etc.

Figure 7:
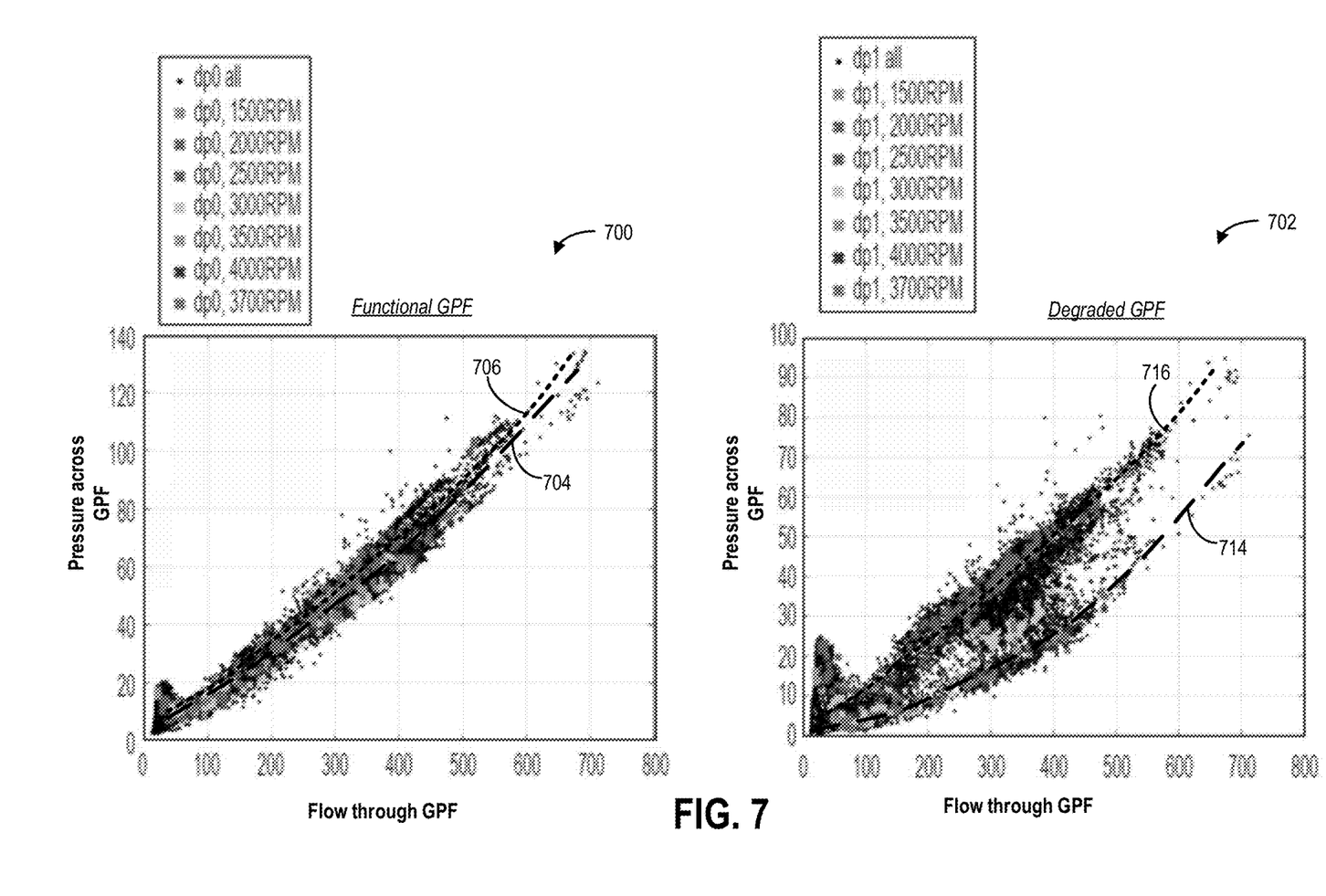
FIG. 7 shows example pressure-flow curves for a GPF diagnostic routine in accordance with the present disclosure.

Turning now to FIG. 7, an example of diagnosing a GPF using pressure-flow data that has been parsed while taking engine speed into account is shown. Specifically, FIG. 7 depicts a first map 700 showing pressure-flow data collected over a range of engine speeds at a functional GPF. Map 702, in comparison, shows pressure-flow data collected over a range of engine speeds at a degraded GPF. A curve fit of the data collected in the low speed range (see curve fit 704) and the high speed range (see curve fit 706) of the functional GPF substantially overlaps in the case of the functional GPF. A curve fit of the data collected in the low speed range (see curve fit 714) and the high speed range (see curve fit 716) of the functional GPF shows significant divergence in the case of the degraded GPF. Herein, resonances may be set up in the exhaust passage when a GPF is degraded (e.g., missing), the resonance driven by the flow pulsations caused by engine firing. The higher resonances result in a higher pressure drop. At the higher engine speeds, the frequency of the resonance may be too high to set up a standing wave, resulting in a much smaller pressure drop. Therefore, by accounting for the change in pressure-flow relationship with engine speed, a larger pressure drop at lower engine speeds as compared to higher engine speeds can be correlated with degraded GPF health.

Thus, the controller may compare a first relationship between exhaust flow rate and GPF differential pressure, measured in a first engine speed range to a second relationship between exhaust flow rate and GPF differential pressure, measured in a second, non-overlapping engine speed range. The controller performs the comparison of the first relationship over a first flow and pressure range to the second relationship over the same first flow and pressure range before indicating degradation of the GPF based on the comparing. Therein, the controller may indicate no degradation when the first and second relationship are aligned with one another within a threshold (as shown at map 700), and indicate degradation when the first and second relationship are misaligned from one another by greater than the threshold (as show at map 710).

In this way, by accounting for the effect of engine speed on changes in a pressure-flow relationship across a GPF, the confounding effects of ash loading on a GPF are reduced, allowing a GPF to be more reliably diagnosed with existing pressure sensors. The technical effect of learning the relationship between pressure and flow across a GPF at different engine speed ranges is that a higher separation between pressure-flow curve fits can be identified, even at lower flow rates. Further, the larger separation at higher and lower engine speeds can be used to correlate GPF health. In particular, a larger pressure drop at lower engine speeds relative to higher engine speeds can be used to identify a leaking or missing filter. Overall, the capability of a pressure based GPF monitor is improved.

One example method for an engine exhaust comprises: comparing a first relationship between exhaust flow rate and differential pressure across an exhaust particulate filter, measured in a first engine speed range, to a second relationship between exhaust flow rate and differential pressure across the particulate filter, measured in a second engine speed range; and indicating particulate filter degradation based on the comparing. In the preceding example, additionally or optionally, the indicating includes illuminating a warning light. In any or all of the preceding examples, additionally or optionally, the comparing is performed while exhaust flow rate is above a threshold flow rate. In any or all of the preceding examples, additionally or optionally, the first engine speed range includes engine speed lower than a threshold speed, the second engine speed range includes engine speed higher than the threshold speed, and wherein the first engine speed range is non-overlapping with the second engine speed range. In any or all of the preceding examples, additionally or optionally, the comparing includes comparing the first relationship over a first flow and pressure range to the second relationship over the same first flow and pressure range, and wherein the indicating based on the comparing includes indicating no degradation when the first and second relationship are aligned with one another within a threshold, and includes indicating degradation when the first and second relationship are misaligned from one another by greater than the threshold. In any or all of the preceding examples, additionally or optionally, the differential pressure is estimated by one of a single gage pressure sensor coupled upstream of the particulate filter in the engine exhaust, a differential pressure sensor coupled across the filter, and a pair of gage pressure sensors coupled upstream and downstream of the filter in the engine exhaust. In any or all of the preceding examples, additionally or optionally, the indicating includes indicating degradation responsive to a higher than threshold difference between the first and the second relationship, the threshold difference adjusted as a function of barometric pressure. In any or all of the preceding examples, additionally or optionally, the first relationship includes a first curve fit of the exhaust flow rate and the differential pressure measured in the first speed range, and the second relationship includes a second curve fit of the exhaust flow rate and the differential pressure measured in the second speed range. In any or all of the preceding examples, additionally or optionally, the indicating includes indication degradation responsive to, at a given exhaust flow rate, a higher than threshold differential pressure across the filter in the first engine speed range and a lower than threshold differential pressure across the filter in the second engine speed range. In any or all of the preceding examples, additionally or optionally, the indicating degradation includes indicating that the filer is leaking or missing. In any or all of the preceding examples, additionally or optionally, the exhaust particulate filter is a gasoline particulate filter.

Another example engine method comprises: initiating a monitor responsive to exhaust flow being higher than a threshold rate; incrementing or decrementing a counter based on sensed differential pressure across a gasoline particulate filter relative to a threshold pressure, the threshold pressure based on engine speed; retrieving an output of the counter after a duration since initiating the monitor; and responsive to the output being higher than a threshold value, indicating degradation of the filter. In any or all of the preceding examples, additionally or optionally, the threshold pressure is further based on barometric pressure and the incrementing or decrementing includes incrementing the counter responsive to sensed differential pressure falling below the threshold pressure; and decrementing the counter responsive to sensed differential pressure exceeding the threshold pressure. In any or all of the preceding examples, additionally or optionally, the incrementing includes incrementing the output of the counter by an amount based on a difference between the sensed differential pressure and the threshold pressure, and wherein the decrementing includes decrementing the output of the counter by an amount based on the difference between the sensed differential pressure and the threshold pressure. In any or all of the preceding examples, additionally or optionally, the duration is based on each of an integrated value of exhaust flow and an integrated value of engine speed over an average drive cycle. In any or all of the preceding examples, additionally or optionally, the sensed differential pressure is sensed via one of a single gage pressure sensor coupled upstream of the particulate filter in an engine exhaust, a differential pressure sensor coupled across the filter, and a pair of gage pressure sensors coupled upstream and downstream of the filter in the engine exhaust. In any or all of the preceding examples, additionally or optionally, distinguishing between filter leakage and filter absence based on a measured relationship between the exhaust flow and the sensed differential pressure.

Another example engine system comprises: an engine including an exhaust passage; a gasoline particulate filter coupled in the exhaust passage; one or more gage pressure sensors coupled to the filter for estimating a differential pressure across the filter; a flow sensor coupled upstream of the filter in the exhaust passage for estimating an exhaust flow rate through the filter;

and a controller with computer readable instructions stored on non-transitory memory that when executed cause the controller to measure pressure data via the one or more pressure sensors while the exhaust flow rate is higher than a threshold rate; and in response to a curve fit of the pressure data being lower than a threshold, indicate degradation of the filter, the threshold based on the exhaust flow rate and engine speed. In any or all of the preceding examples, additionally or optionally, the engine further comprises an engine intake passage including an intake throttle, and wherein the controller includes further instructions to, responsive to the indicating of degradation, limit an opening of the intake throttle to limit engine output torque. In any or all of the preceding examples, additionally or optionally, the indicating degradation includes, in response to the curve fit of the pressure data being lower than the threshold, incrementing a counter stored in the memory of the controller; and indicating degradation of the filter responsive to an output of the counter, retrieved after a duration of measuring the pressure data, being higher than a threshold value. In any or all of the preceding examples, additionally or optionally, the pressure data is measured while engine speed is higher than an idling speed.

In another representation, the engine system is coupled in a hybrid vehicle or an autonomous vehicle.

In another representation, a method for a gasoline particulate filter coupled in a direct injected engine comprises: estimating a difference between a first curve fit of exhaust flow rate and differential pressure across an exhaust particulate filter in a first engine speed range, to a second curve fit between exhaust flow rate and differential pressure across the particulate filter, in a second engine speed range, and indicating particulate filter degradation based on the difference relative to a threshold, the threshold adjusted as a function of altitude or barometric pressure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
   initiating a monitor responsive to exhaust flow being higher than a threshold rate; incrementing or decrementing a counter based on sensed differential pressure across a gasoline particulate filter relative to a threshold pressure, the threshold pressure based on engine speed;
   retrieving an output of the counter after a duration since initiating the monitor; and
   responsive to the output being higher than a threshold value, indicating degradation of the filter.

2. The method of claim 1, wherein the threshold pressure is further based on barometric pressure and the incrementing or decrementing includes:
   incrementing the counter responsive to sensed differential pressure falling below the threshold pressure; and
   decrementing the counter responsive to sensed differential pressure exceeding the threshold pressure.

3. The method of claim 2, wherein the incrementing includes incrementing the output of the counter by an amount based on a difference between the sensed differential pressure and the threshold pressure, and wherein the decrementing includes decrementing the output of the counter by an amount based on the difference between the sensed differential pressure and the threshold pressure.

4. The method of claim 1, wherein the duration is based on a total time spent with flow and engine speed within corresponding target ranges over an average drive cycle.

5. The method of claim 1, wherein the sensed differential pressure is sensed via one of a single gage pressure sensor coupled upstream of the particulate filter in an engine exhaust, a differential pressure sensor coupled across the filter, and a pair of gage pressure sensors coupled upstream and downstream of the filter in the engine exhaust.

6. The method of claim 1, wherein indicating degradation of the filter includes distinguishing between filter leakage and filter absence based on a measured relationship between the exhaust flow and the sensed differential pressure.

7. An engine system, comprising:
   an engine including an exhaust passage;
   a gasoline particulate filter coupled in the exhaust passage;
   one or more gage pressure sensors coupled to the filter for estimating a differential pressure across the filter;
   a flow sensor coupled upstream of the filter in the exhaust passage for estimating an exhaust flow rate through the filter; and
   a controller with computer readable instructions stored on non-transitory memory that when executed cause the controller to:
      measure pressure data via the one or more pressure sensors while the exhaust flow rate is higher than a threshold rate;
      in response to a curve fit of the pressure data being lower than a threshold based on the exhaust flow rate and an engine speed, incrementing a counter stored in the memory of the controller;
      in response to the curve fit of the pressure data being greater than the threshold, decrementing the counter; and
      indicate degradation of the filter based on an output of the counter, retrieved after a duration of measuring the pressure data, being higher than a threshold value.

8. The system of claim 7, wherein the engine further comprises an engine intake passage including an intake throttle, and wherein the controller includes further instructions to: responsive to the indicating of degradation, limit an opening of the intake throttle to limit engine output torque.

9. The system of claim 7, wherein the pressure data is measured while engine speed is higher than an idling speed.

* * * * *